United States Patent [19]

Green

[11] Patent Number: 4,829,875
[45] Date of Patent: May 16, 1989

[54] OVER-CENTRE LOCKING TOOL

[75] Inventor: Kenneth O. Green, Ontario, Canada

[73] Assignee: Queen's University at Kingston, Ontario, Canada

[21] Appl. No.: 242,537

[22] Filed: Sep. 12, 1988

[51] Int. Cl.⁴ ............................................. B25B 7/02
[52] U.S. Cl. .................................... 81/426.5; 269/6; 269/269; 269/904
[58] Field of Search ................ 81/420, 426.5; 269/6, 269/37, 87, 269, 904

[56] References Cited

U.S. PATENT DOCUMENTS

| | | | |
|---|---|---|---|
| 3,908,490 | 9/1975 | Durham | 81/426.5 X |
| 4,176,830 | 12/1979 | Isley | 269/6 |
| 4,386,543 | 6/1983 | Walker, Jr. | 81/420 |
| 4,725,049 | 2/1988 | Cantarinhas | 81/420 X |

Primary Examiner—James G. Smith
Attorney, Agent, or Firm—Richard J. Hicks

[57] ABSTRACT

A clamping tool of the "Vise-Grip" type for holding two pieces of sheet metal in overlying abutting Relationship so that they can be welded or rivetted together. The tool is particularly useful in situations when one side of the work area is inaccessible as it can be manipulated, and removed, quite readily from one side. The tool includes a pivoting shoe on one handle and a fixed jaw comprising complementary C-shaped sections in different planes, mounted on the second handle.

3 Claims, 3 Drawing Sheets

OVER-CENTRE LOCKING TOOL

FIELD OF INVENTION

This invention relates to clamping tools, and more particularly to a clamping tool having adjustable jaws adapted to engage sheet materials together in an overlying relationship.

BACKGROUND OF INVENTION

Numerous clamping tools have been developed for commercial, industrial and home use and include many different types of clamping systems.

One of the most popular systems incorporates the well known "Vise-Grip" sold by the Peterson Manufacturing Company of DeWitt, Nebr., which is a grip actuated toggle clamp. Numerous variations and special jaws for the "Vise-Grip" have been suggested for specific applications, and attention is drawn to U.S. Pat. Nos. 3,124,347, 3,229,554, 4,475,728, 4,384,403 and 4,673,174 all of which incorporate the basic grip actuated toggle clamp of the "Vise-Grip" with jaws specifically designed to facilitate a particular function, such as a C-clamp or for sheet metal bending, forming and crimping. Although all such tools are useful for all of these important functions, none are adapted to secure two sheets of sheet metal in overlying relationship in situations in which the work area is only accessible from one side of the workpiece and remote from the edges of one of the workpieces. One such situation is that of inserting a plate into a preformed sheet metal air duct, another might be holding a patch over a hole in a large automotive stamping such as a fender or door, so that it may be riveted or welded into place. The present invention is designed to satisfy this need.

SUMMARY OF INVENTION

It is an object of the present invention to provide a clamping tool usable to secure sheet metal workpieces in overlying relationship to each other when the work pieces are only accessible from one side.

It is another object of the invention to provide a clamping tool which can be used to secure two sheet metal work pieces on overlying relationship and which can be moved progressively around the circumference of one of the workpieces as the work proceeds, and withdrawn completely before final completion of the joining operation.

Thus, by one aspect of this invention there is provided: a toggle actuated clamping device comprising: first and second handle means operatively associated with a locking mechanism therebetween and including releasing means and adjusting means at respective first ends thereof: a longitudinal planar member pivotally mounted at said one end about a first transverse axis at one end thereof to a second end of said first handle means and pivotally mounted about a second transverse axis parallel but spaced from said first transverse axis, intermediate the ends of said second handle means: shoe means pivotally mounted about a third, parallel, transverse axis at a second end of said planar member: and jaw means rigidly mounted at the second end of said second handle means: said jaw means having a first C-shaped section, in a plane perpendicular to said second transverse axis, arranged to receive a first workpiece therein in a plane parallel said second transverse axis, and a second C-shaped section, in planes parallel but spaced from said second transverse axis arranged to receive a second workpiece between a lower surface thereof adjacent said firs C-shaped section and an upper surface thereof adjacent a free end thereof, so that, when inserted in operative position, said first and second workpieces lie in overlapping abutting relationship.

DETAILED DESCRIPTION OF PREFERRED EMBODIMENT

Figure 2:
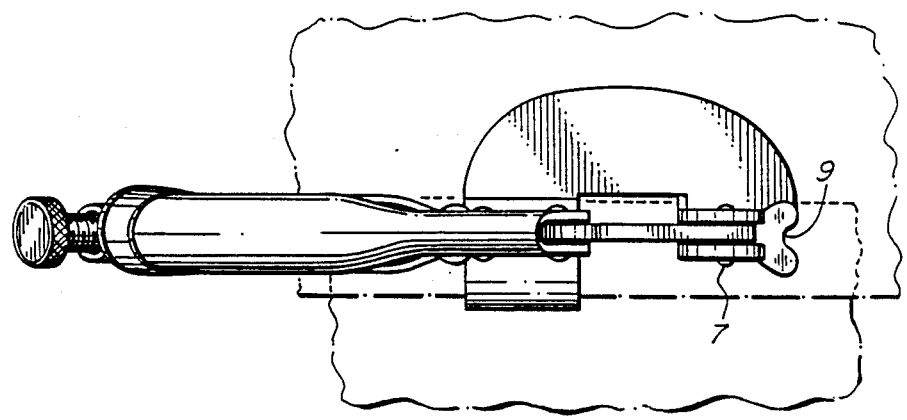
FIG. 2 is a top plan view of the embodiment of FIG. 1.
Figure 1:
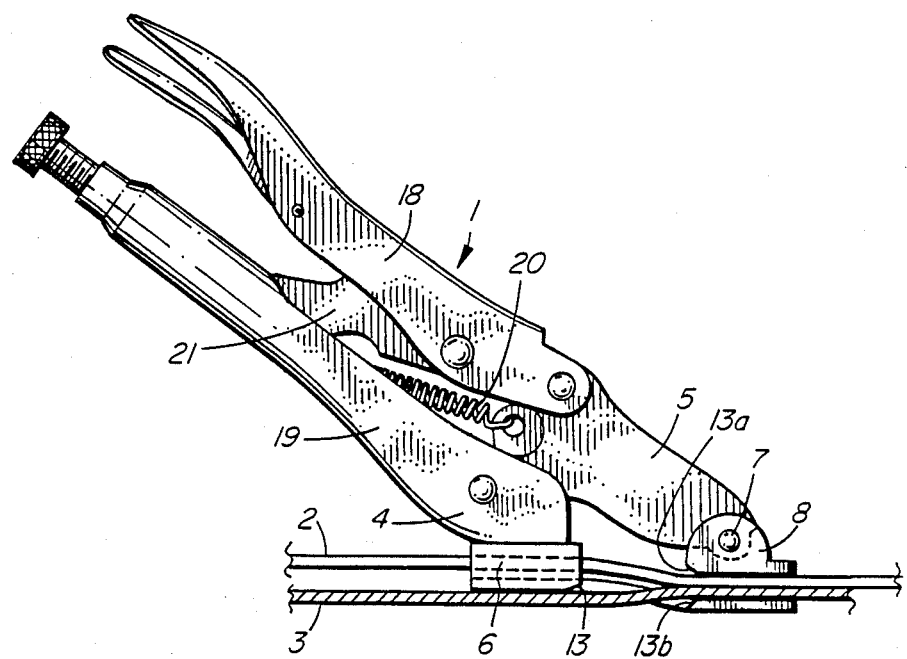
FIG. 1 is a side elevational view of the one embodiment of the invention.
Figure 4:
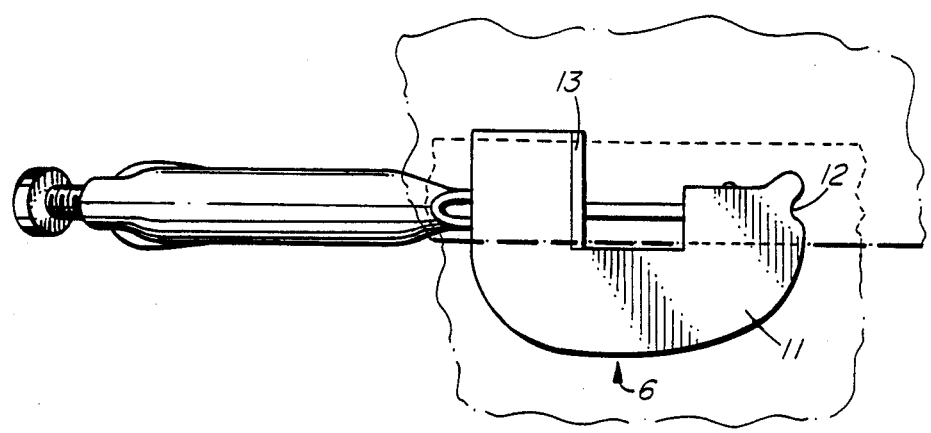
FIG. 4 is a bottom plan view of the embodiment of FIG. 1.

In FIG. 1 there is shown a Vise-Grip 1 of conventional design with the special jaws of the present invention engaging two sheets of metal 2,3 in overlying relationship. The vise grip 1 has a fixed jaw 4 and a movable or pivoting jaw 5 associated with handles 19 and 18 respectively. Handles 18 and 19 are operatively connected to a spring 20 and toggle arm 21 to provide a locking device in known manner. The foot or plate 6 rigidly mounted on fixed jaw 4 will be described in more detail hereinafter. Pivotally mounted about an axis 7 on pivoting jaw 5 is a small shoe 8 which provides the upper clamping surface. Preferably, but not essentially shoe 8 has a guide groove 9 formed therein to facilitate locating a drill bit as described hereinafter.

Figure 3:
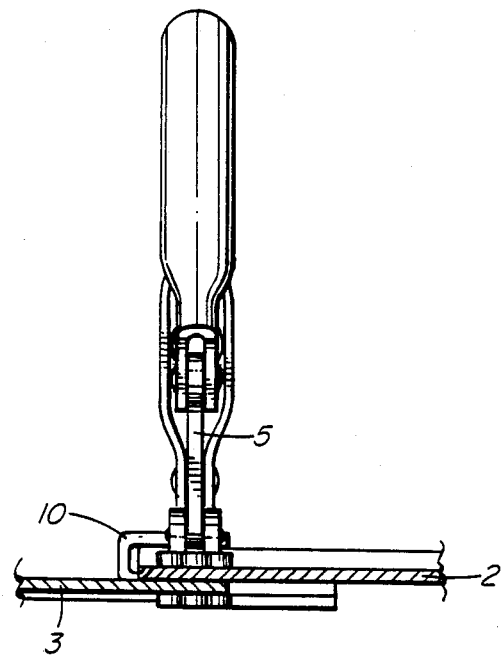
FIG. 3 is a front view of the embodiment of FIG. 1.
Figure 5:
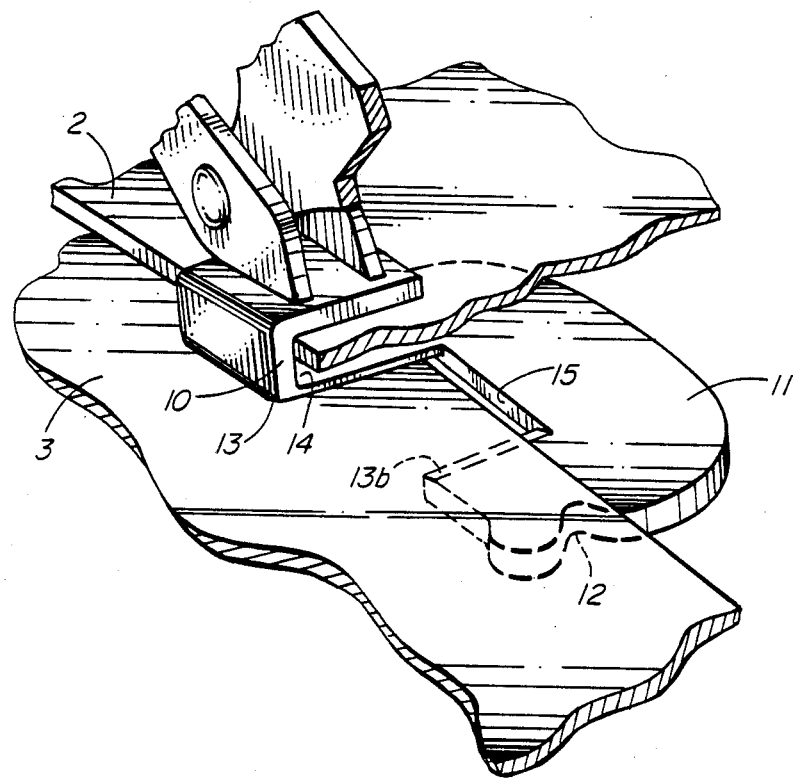
FIG. 5 is an enlarged perspective view of the lower jaw plate of the embodiment of FIG. 1.

As seen in FIG. 1, foot 6 is rigidly attached to handle 19 of vise grip 1, at an included angle of about 45°. As seen most clearly in FIGS. 3 and 5, foot 6 has an upper 'C' shaped section 10, as seen in vertical cross section, and a lower C-section II as seen in horizontal cross section, extending forwardly nd slightly downwardly from the section 10. As seen most clearly in FIGS. 1 and 5 the upper surface of section 11 extends from an upper plane forming part of section 10 downwardly to a lower plane adjacent the forward end thereof. A notch 12 is provided at the forward ends, to complement notch 9 in upper shoe 8, and edges 13, 13a and 13b may be chamfered to facilitate feeding of lower workpiece 3.

In operation, the upper workpiece 2 is located in slot 14 provided by the 'C' shaped section 10, and the lower work piece 3 is located under section 10 and over the forward end of section 11, as seen in FIG. 1. Handles 18 and 19 can then be operated to clamp pivoting shoe 8 over the lower forward end of section 11 with the two work pieces 2,3, therebetween.

Using guide 9 and notch 10 to guide a drill bit, accurately aligned holes may now be drilled through work pieces 2,3 to receive pop rivets or the like. The clamped handles 18, 19 can be released and the entire unit can be slid along the lower workpiece 3 to any selected position and reclamped to repeat the drilling operation. Alternatively the unit can be moved to accommodate a brazing, soldering or welding operation. It will be appreciated that the device is particularly useful to hold a circular or rectangular patch or lower workpiece 3 in place through a similarly shaped hole in the upper workpiece 2 when access to the lower side is restricted or impossible. The two workpieces are accurately aligned with a predetermined overlap, the size of which is governed by the depth of slot 14 relative to face 15 of the plate 6. It will also be appreciated that prior to final closure of the repair, the clamp device must be removed from the work site. This may be effected by a simple twisting movement to release the front end of plate 6 from beneath workpiece 3 and sliding plate 11 from between workpieces 2 and 3.

I claim:

1. A toggle actuated clamping device comprising: first and second handle means operatively associated with a locking mechanism therebetween and including releasing means and adjusting means at respective first ends thereof; a longitudinal planar member pivotally mounted at one end thereof about a first transverse axis to a second end of said first handle means and pivotally mounted about a second transverse axis parallel but spaced from said first transverse axis, intermediate the ends of said second handle means; shoe means pivotally mounted about a third, parallel, transverse axis at a second end of said planar member, and jaw means rigidly mounted at the second end of said second handle means; said jaw means having a first C-shaped section, in a plane perpendicular to said second transverse axis, arranged to receive a first workpiece therein in a plane parallel said second transverse axis, and a second C-shaped section, in planes parallel but spaced from said second transverse axis arranged to receive a second workpiece between a lower surface thereof adjacent said first C-shaped section and an upper surface thereof adjacent a free end thereof, so that, when inserted in operative position, said first and second workpieces lie in overlapping abutting relationship.

2. A clamping device as claimed in claim 1 wherein said shoe means and said free end of said second C-shaped section include guide means so as to facilitate drilling through said workpieces.

3. A clamping device as claimed in claim 1 wherein said first and second handle means lie at an angle of about 45° to the plan of said workpieces.

* * * * *